J. W. OMAN.
AIRSHIP.
APPLICATION FILED JAN. 23, 1912. RENEWED OCT. 21, 1916.
1,227,650.
Patented May 29, 1917.
12 SHEETS—SHEET 8.
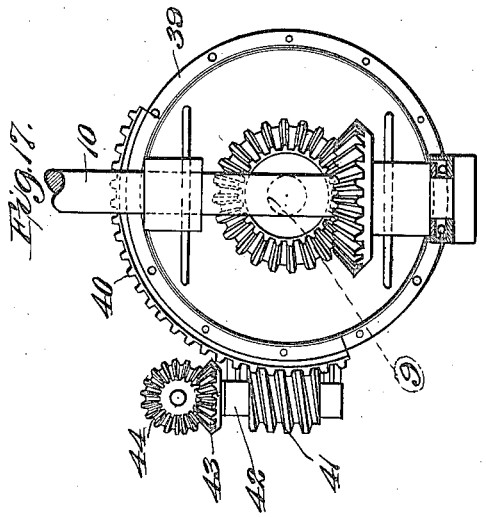
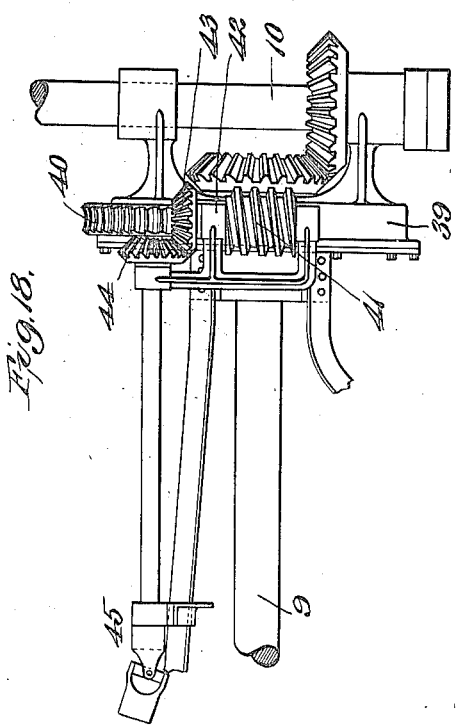
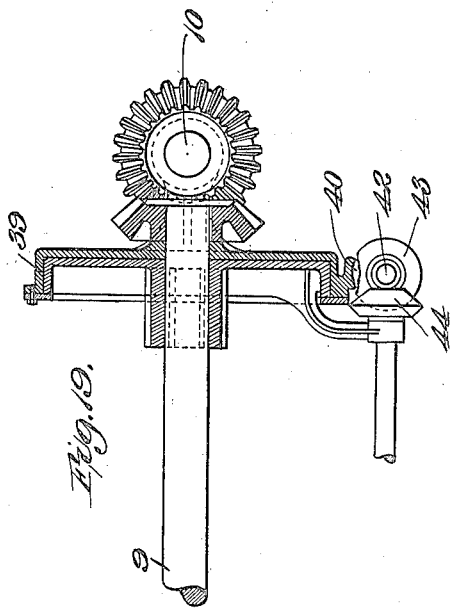
WITNESSES:
INVENTOR.
John W. Oman,
BY Rippey & Kingsland
ATTORNEYS.

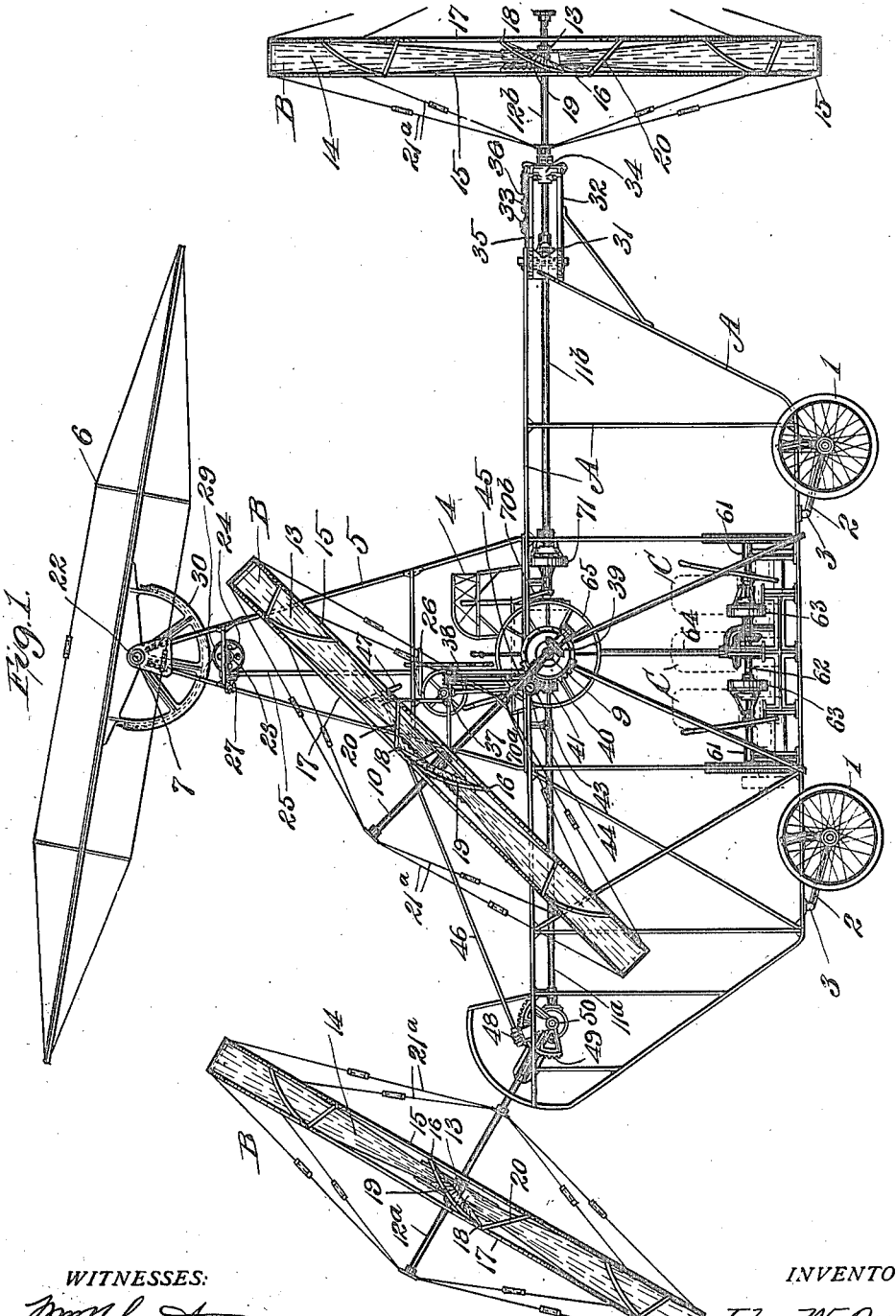

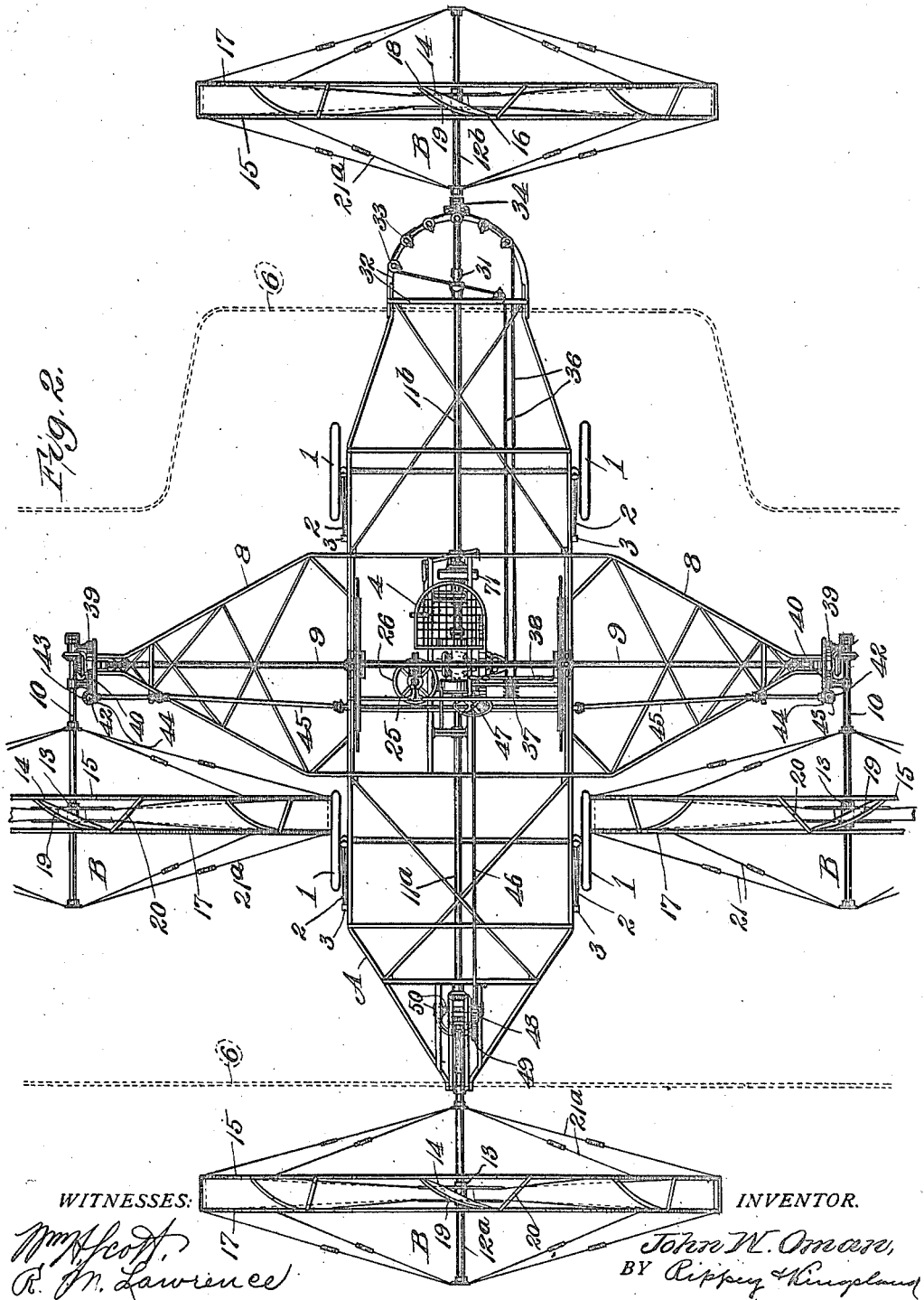

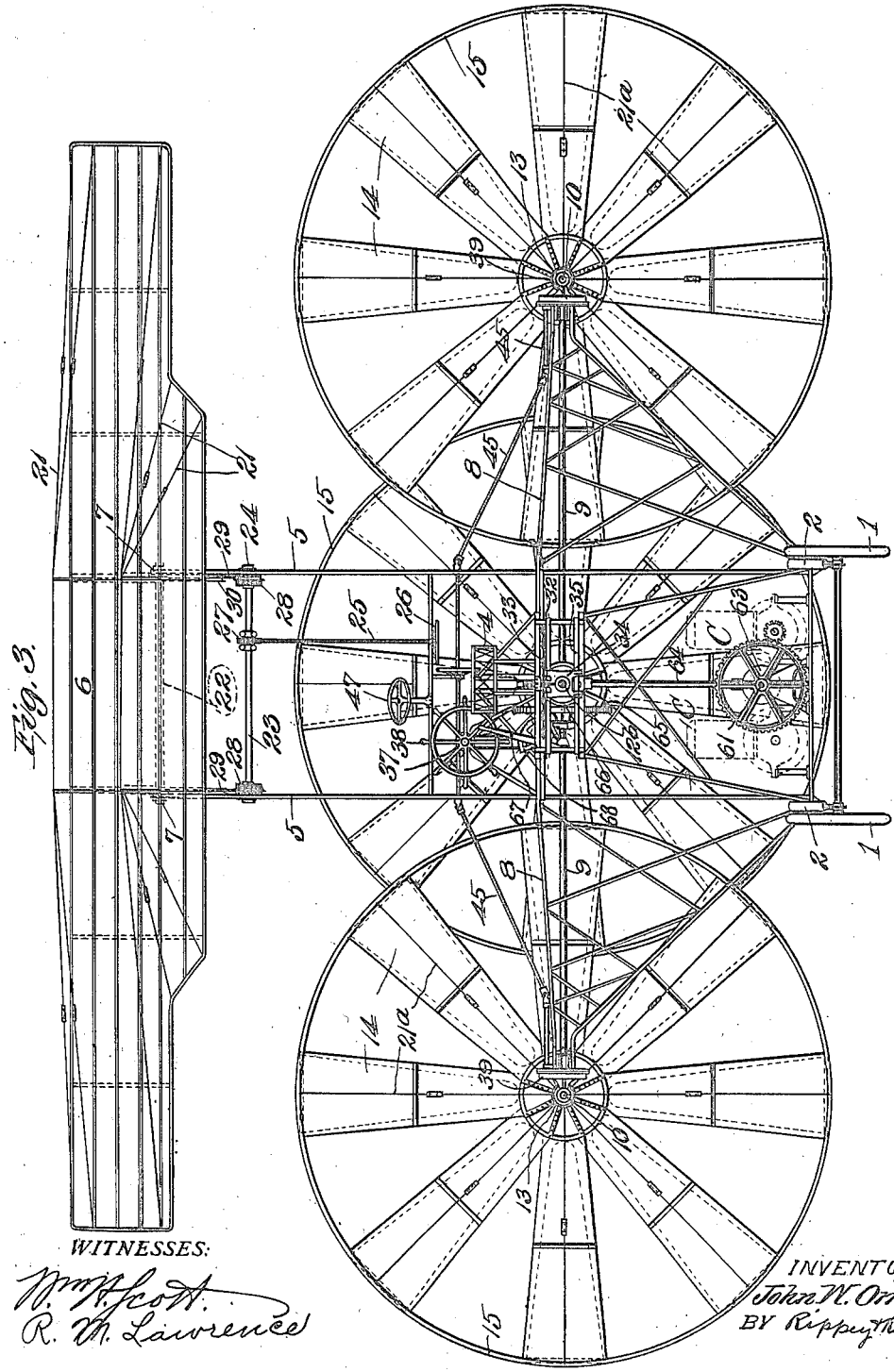

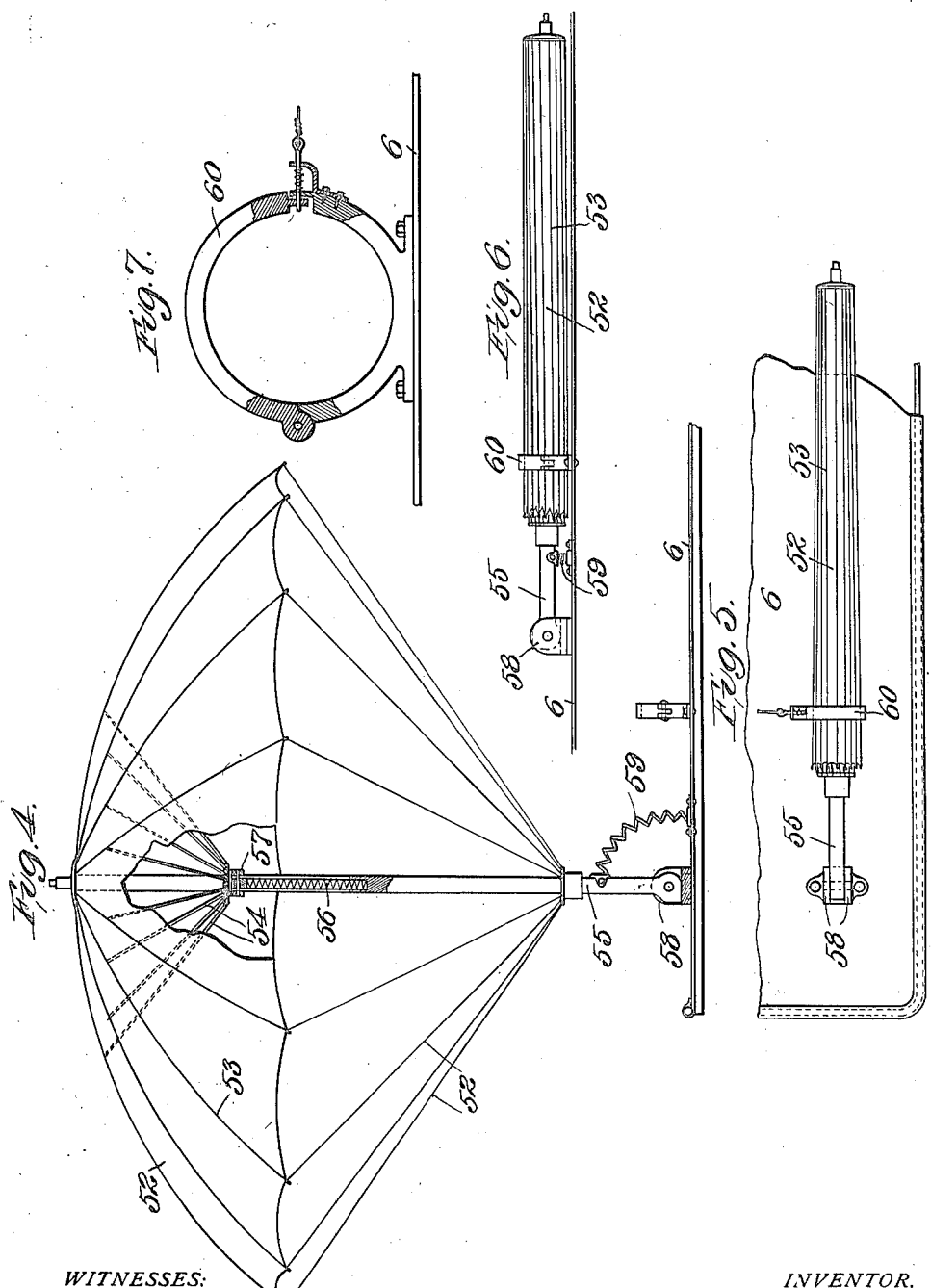

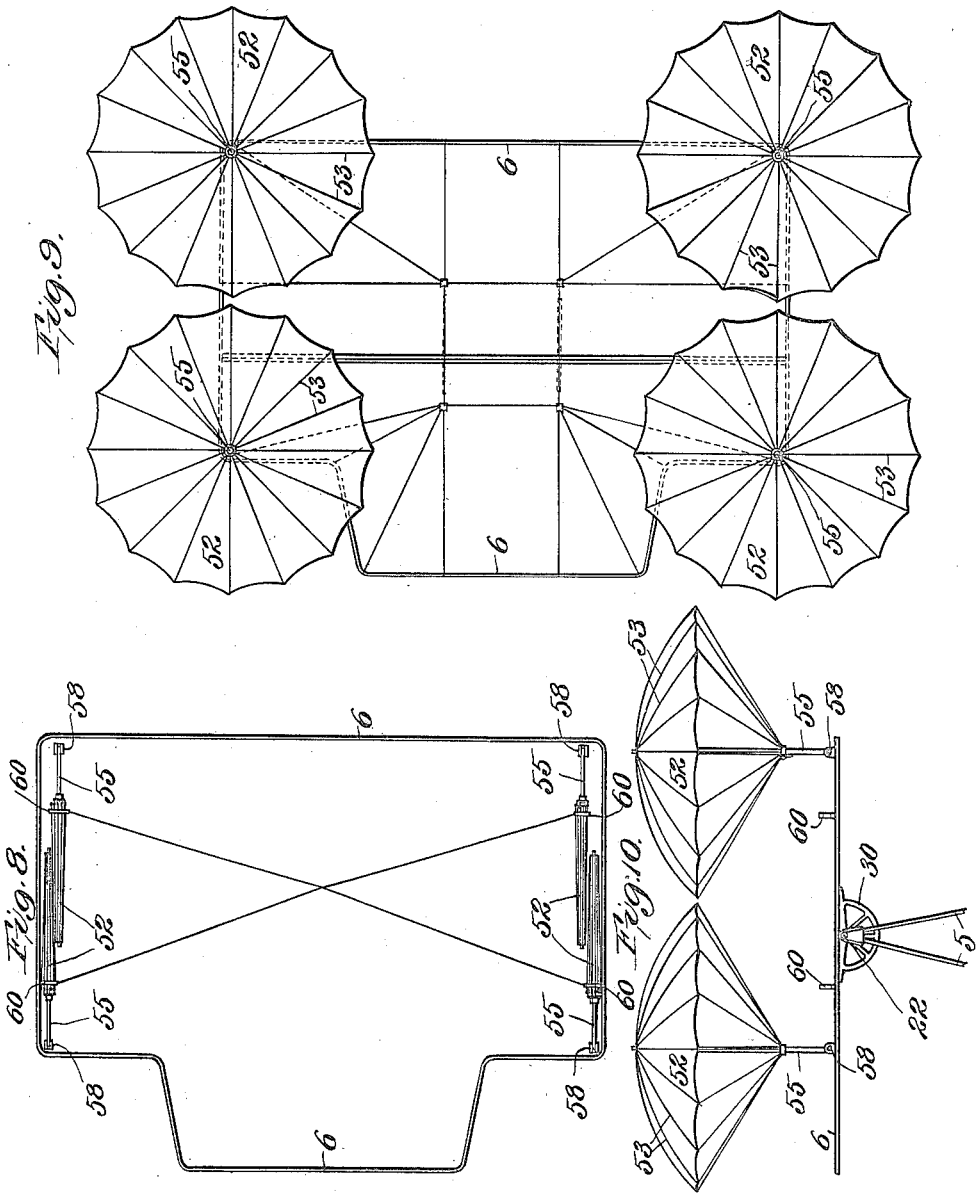

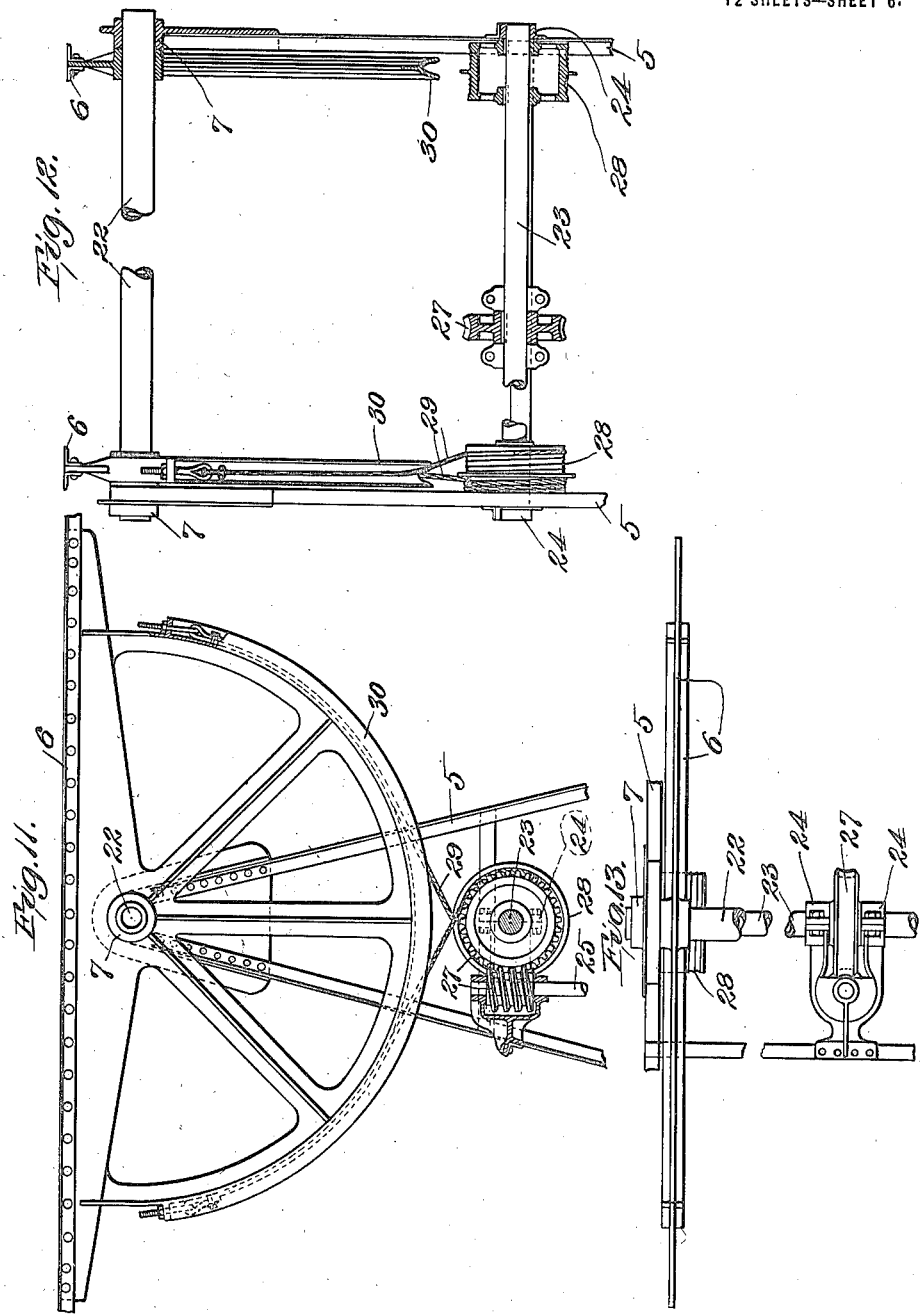

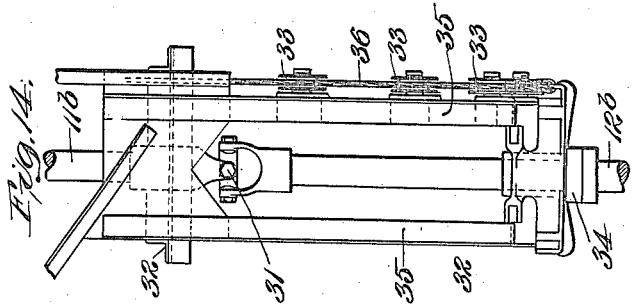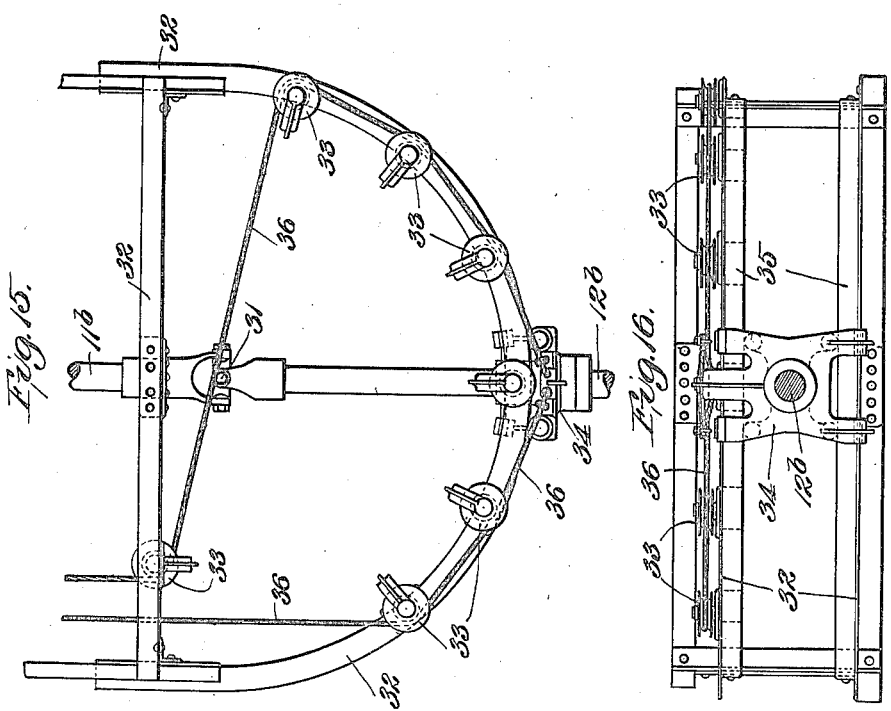

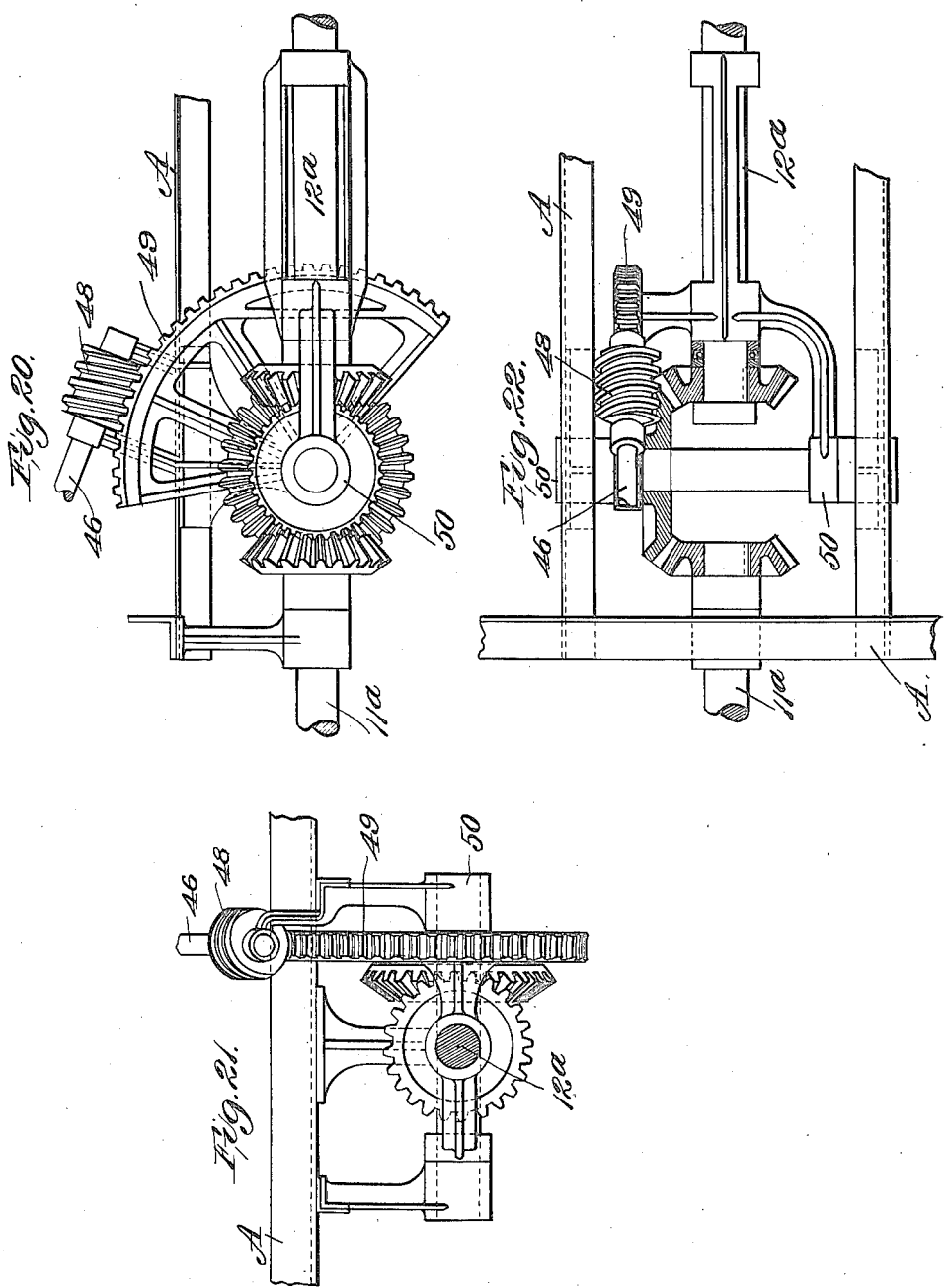

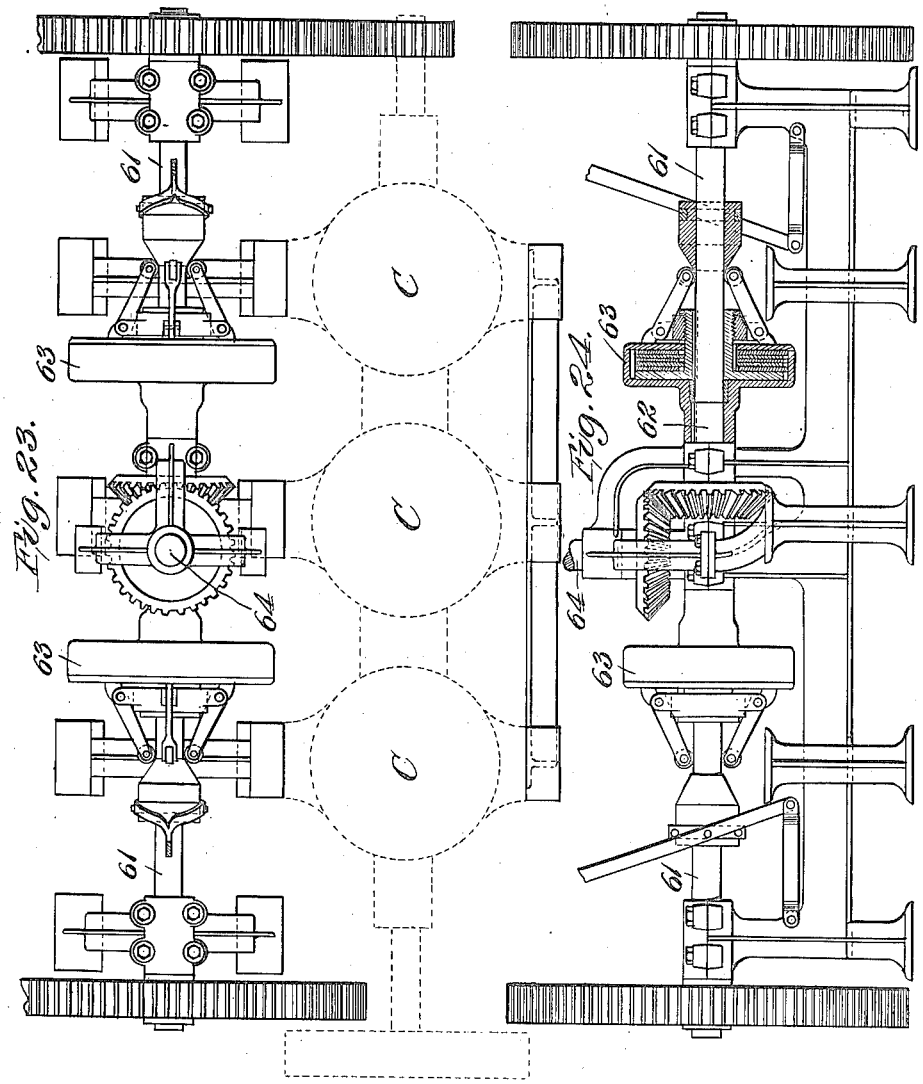

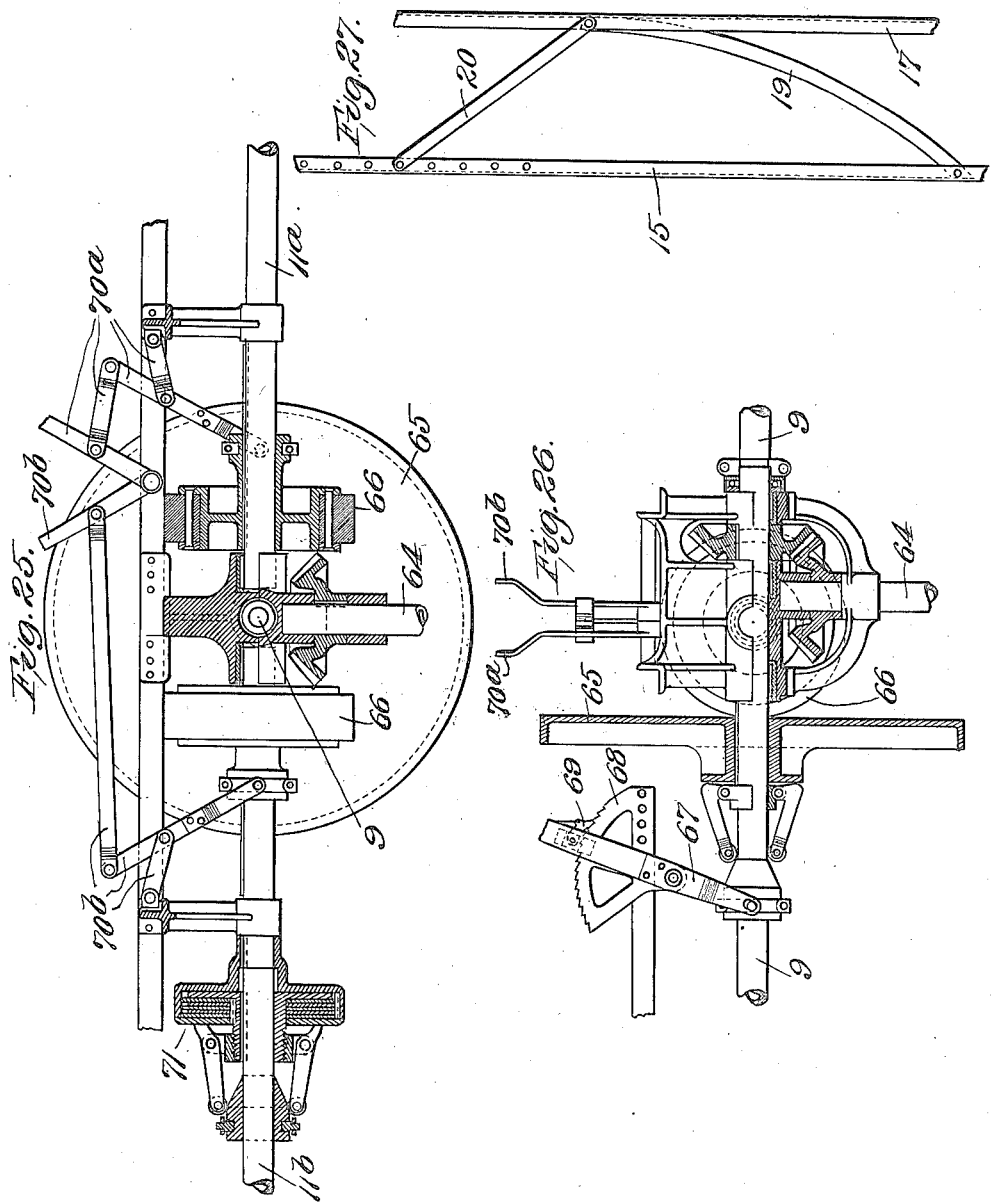

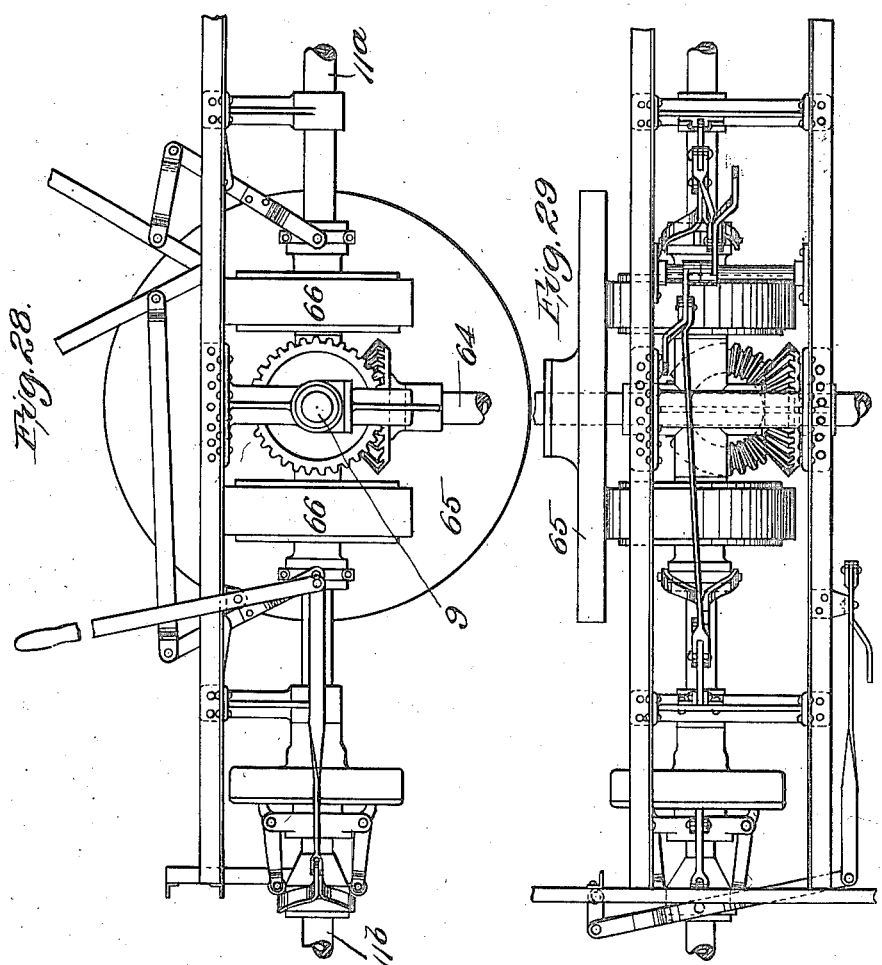

UNITED STATES PATENT OFFICE.

JOHN W. OMAN, OF HOUSTON, TEXAS.

AIRSHIP.

1,227,650.  Specification of Letters Patent.  Patented May 29, 1917.

Application filed January 23, 1912, Serial No. 672,982. Renewed October 21, 1916. Serial No. 127,036.

*To all whom it may concern:*

Be it known that I, JOHN W. OMAN, a citizen of the United States, residing at Houston, Harris county, Texas, have invented a new and useful Airship, of which the following is a specification.

This invention relates to airships, and more particularly to that class of mechanism for aerial navigation which is heavier than air, and which is raised, propelled, held in equilibrium, steered and lowered by a system of driven blade-wheels, which are assisted in the performance of their several functions by a plane or a plurality of planes.

An object of the invention is to provide an air vehicle of the character mentioned with a series of adjustable helicopters and propellers for the control of the vehicle.

Another object is to equip the vehicle with aeroplanes, which supplement and assist the system of helicopters and propellers in sustaining the vehicle, and in controlling its flight.

Another object is to provide, in connection with the vehicle, safety devices of novel construction, whereby a sudden falling or collapse of the vehicle will be prevented.

To these and other ends I have designed and combined the several coöperating parts hereinafter described, and particularly pointed out in the claims, a preferred arrangement thereof being fully illustrated in the drawings, in which—

Figure 1 is a side elevation of a complete airship embodying my invention; Fig. 2 is a plan view thereof; Fig. 3 is a rear elevation of the same; Fig. 4 is a detail view of one of the safety devices, shown in open adjustment; Fig. 5 is a plan view of the same, shown in closed adjustment; Fig. 6 is a side view of the same; Fig. 7 is a detail view of the retaining device for holding said safety devices in closed adjustment; Fig. 8 is a plan view of a plane, showing a preferred manner of disposing the safety devices thereon; Fig. 9 is a plan view of the same parts, showing the safety devices in open adjustment; Fig. 10 is a side view of the plane, showing two of the safety devices in open adjustment; Fig. 11 is a side view of a part of the plane adjusting mechanism; Fig. 12 is an end view, partially in section, of the same mechanism; Fig. 13 is a broken plan view of a part of the same mechanism; Fig. 14 is a side view of a portion of the mechanism for controlling the rear propeller; Fig. 15 is a plan view thereof; Fig. 16 is an end view of the same mechanism; Fig. 17 is a side view of a portion of the mechanism for controlling one of the side helicopters or propellers; Fig. 18 is a side view of a part of the same mechanism; Fig. 19 is a horizontal sectional view of the same parts; Fig. 20 is a side view of a part of the mechanism for controlling the front propeller; Fig. 21 is a front view of the same parts; Fig. 22 is a plan view of the parts shown in Fig. 20; Fig. 23 is a plan view of the lower power transmission mechanism, including clutches for controlling the same, the engines and main shaft being shown in dotted lines; Fig. 24 is a side view of the same mechanism, one of the clutches being shown partially in section; Fig. 25 is a side view looking from the right of the machine, of the upper power transmission mechanism, also including the clutch friction disk for controlling the shafts which drive the front and rear propellers; Fig. 26 is a front view, partially in section, of the transverse shaft gearing to the vertical power shaft, this illustration also shows the detail of the friction disk drive from the transverse to the longitudinal shafts; Fig. 27 is a detail of the adjustable bracing for the propeller rims; Fig. 28 is a side elevation of substantially the same parts as are illustrated in Fig. 26, and Fig. 29 is a plan view thereof.

The body or fuselage of the airship comprises a frame-work A of any suitable material, arranged preferably in the form shown in Fig. 1. The frame work may be, and preferably should be, covered with some water proof material, such for instance, as canvas or the like, so as to provide an inclosed car for the protection of passengers and freight, as well as the mechanism located therein, and for landing in water.

The vehicle is supported on suitable running and alighting gearing, comprising in the present instance wheels 1, carried on arms 2, pivoted in advance of the axles of the wheels in lugs 3, which are suitably attached to the bottom of the body A of the vehicle. By suitable transmission mechanism (not shown) said wheels 1 may be actuated by a motor to propel the vehicle on the surface of the earth. This initial propulsion of the vehicle, however, is not necessary in order to elevate the airship, but the vehicle may be lifted directly from stationary position by means of the lifting mechanism, as will be hereinafter explained.

The upper part of the frame-work may carry a deck, or may be in skeleton form, as desired. An operator's seat 4 is suitably secured to the upper part of the frame, preferably at the center of the deck, and adjacent to the operating levers so that the machine may be conveniently controlled and operated by a single aviator. To the upper part of the frame-work A are rigidly secured at either side thereof vertical supports 5, of sufficient strength to support the plane 6 which is adjustably mounted in bearings 7 in the upper part of said supports. Lateral supports 8 extend from the frame A on either side, in which is journaled horizontal transversely disposed power transmitting shaft 9, and adjustable propeller shafts 10 on which helicopters or propellers B are mounted. Longitudinal power transmission shafts $11^a$ and $11^b$ and propeller shafts $12^a$ and $12^b$ are journaled in hangers suitably supported by the frame A; the shaft $12^a$ having affixed thereto the front propeller or helicopter and the shaft $12^b$ carrying the rear propeller or steering wheel.

The motors C of any desired type are carried on the lower part of the body of the vehicle, and are provided with suitable clutch and transmission mechanism which will be hereinafter more fully described. I prefer to provide two separate motors, either of which should be of sufficient power to actuate the entire mechanism, so that one may always be held in reserve for an emergency, and I have provided means for readily changing from one to the other, thus materially adding to the safety of the machine. Or if additional power may be required at any time both motors may be used at the same time, and may be readily adjusted for such purpose, as the occasion for their joint use may arise.

The propellers B are substantially uniform in structure, and are of novel arrangement especially adapted for the present purpose. Each propeller comprises a hub or axle 13, to which are suitably affixed the inner ends of a series of radiating blades 14. The blades 14 may be formed of any suitable material, preferably of durable sheet metal, such for instance as sheet iron, tin, aluminium or the like. Or they may be made in the form of a light frame covered with silk, canvas or like material. These blades are arranged to slightly overlap at the inner adjacent edges and radiate outwardly, one of the outer corners of each blade being pivoted to an inner peripheral band 15, as shown at 16 and the other corner pivoted to an outer band 17, as shown at 18. The bands 15 and 17 are trussed or supported apart by means of the adjustable mechanism shown in Fig. 27 of the drawings. The link 19 is curved and is so pivoted to the two peripheral bands as to brace said bands apart. The link or support 20 is adjustably pivoted to said bands and is adapted to space said bands apart or draw them together, as desired. It will be apparent that the manipulation of the peripheral bands is effective to adjust the blades 14 and that when the bands are spaced apart the blades will lie in a diagonal or oblique position with respect to the hub 13, and that when the bands are drawn together the blades will assume a horizontal position with respect to said hub. In this manner the propellers may be so adjusted as to vary their resistance against the atmosphere so that they may be more or less powerful in performing their lifting or propelling functions. I provide for supporting and tensioning the propellers, a series of guy or tensioning wires $21^a$, secured in a collar on either side of the wheel.

It will be apparent that propellers of the above described design will possess great propelling force. In the control of the machine the side propellers are carried upon an adjustable shaft and in the elevating of the vehicle the shaft is raised to a vertical position and the propellers revolved, thereby causing the vehicle to ascend directly from the ground. After the vehicle has attained the desired height, by causing the side propellers to rotate at a reduced rate of speed a balance may be attained and the machine may be caused to stand or be balanced at any desired position. The front propeller performs the function of a tractor when it is desired to propel the mechanism in a horizontal course. In elevating the machine from the ground, the front propeller may be adjusted so as to rotate in a horizontal plane with respect to the frame of the machine, thus assisting the side propellers in lifting the machine. By varying the speed of rotation, the front propeller is effective to maintain an exact longitudinal balance. The rear propeller has the function of propulsion and may also be used, by lateral adjustment, as a rudder for guiding the course of the vehicle. By causing the side propellers to assume a vertical or oblique position with respect to the body of the vehicle they may be used as tractors also, and thereby add their power in the propulsion of the vehicle in a horizontal course.

The aeroplane 6 may be constructed of any suitable material and comprises a frame or truss which may be covered with canvas or other suitable material and is supported and strengthened by suitable guy wires 21. A transverse shaft 22 forming a part of the aeroplane frame extends beyond the frame on either side forming trunnions, which are pivotally mounted in bearings 7, which are a part of the aeroplane support.

Any suitable mechanism for the adjustment of the plane may be provided and I have illustrated a preferred form of control, comprising a shaft 23 mounted transversely of the machine in bearings 24 in the aeroplane supports, the shaft 23 being rotated by means of a vertical shaft 25 terminating in a hand wheel 26 adjacent to the aviator's seat 4, said shafts 23 and 25 being operatively connected by suitable gearing 27. The shaft 23 carries on either side and adjacent to the aeroplane support 5 a pulley wheel 28. A cord or wire 29 operatively connects said pulleys 28 with the arcuate lever 30. The manner of adjusting the plane by means of this mechanism at any desired angle is apparent. In raising the vehicle in a vertical course the plane is dropped as near a ninety degree angle with respect to the body of the machine, as possible, so that the resistance of the plane to the air will be reduced. When the machine has attained the desired height and a horizontal course is desired the plane is adjusted to the desired angle of incidence so that the plane itself will provide a sustaining surface sufficient to sustain the mechanism without the aid of the elevating propellers, which propellers may now be converted into means for propulsion of the vehicle by inclining the shafts 10. When in this adjustment the vehicle is supported on the principle of an aeroplane, and all of the wheels B perform the function of usual propellers or tractors.

The rear propeller in addition to performing the function of propulsion is also adapted to be employed as a rudder in directing the course of the vehicle, as has already been suggested. The control of the propeller for this purpose is accomplished through mechanism, a portion of which is shown in Figs. 14, 15 and 16. The transmission shaft 11$^b$ is provided with a universal knuckle joint 31 which permits the lateral movement of the shaft 12$^b$ and its carried parts. An arcuate frame or support 32 is secured to the rear of the machine and has a series of pulleys 33 operatively mounted therein. A collar 34 is slidably mounted on tracks 35 formed in the support 32. A guide cord or wire 36 is operatively mounted on the pulleys 33 and extends forward passing over a manually controlled pulley 37 attached to a longitudinal shaft which terminates in the hand wheel 38 adjacent to the seat 4. It is apparent that by the use of this mechanism the shaft carrying the rear wheel B may be adjusted laterally very much in the same manner as a rudder of the ordinary steam vessel is controlled. It will be seen that by adjusting the rear propeller on one side or the other the course of the vehicle may be determined.

The control of the side propellers is effected through mechanism, a detail of a portion of which is shown in Figs. 17, 18 and 19 of the drawings, to which special reference will now be made. The shafts 10, which have gear connection with the transverse shafts 9 carrying the side propeller wheel B which are journaled in bearings carried by the annular plates 39, which are revolubly mounted at the ends of each side support. Each of the said plates carries a segmental rack 40, which meshes with worm gear 41 carried on shaft 42.

To the upper end of each of said shafts are rigidly secured beveled gears 43, which mesh with gears 44. By suitable link connections 45 the train of gearing comprising the gears 40, 41, 43 and 44 may be actuated to control the adjustment of the shafts 10. It will be apparent that by means of this mechanism the angle of the shaft 10 may be so adjusted that the side propellers will revolve in any desired position from horizontal to the vertical with respect to the frame of the machine and that the desired adjustment may be readily accomplished by the aviator.

As has been suggested it is desirable that the front propeller may be readily adjusted so as to revolve in a plane horizontal to the frame of the machine or in a plane vertical to the machine or in the intermediate inclined positions. These adjustments are effected directly by manual operation of mechanism a portion of which is shown in detail in Figs. 20, 21 and 22 of the drawings. An inclined shaft 46 terminates adjacent to the operator's seat and is surmounted by a hand wheel 47, for the manipulation thereof. The outer end of said shaft 46 carries a worm 48 which meshes with a segmental rack 49, carried by the journal bearing 50 for the shaft, which carries the front propeller. By this mechanism it is apparent that the shaft may be caused to assume any desired angle of inclination.

As has been suggested I have provided a safety device of novel construction to be used in combination with my present airship, the object of which is to prevent the sudden collapse or descent of the vehicle in the event of any accident to the operating mechanism. I have fully illustrated the details and design of these devices and their manner of application to the present mechanism in Figs. 4 to 10 of the drawings. The device itself comprises a hood 52 in the form of an umbrella, having ribs 53 which are braced by cords 54. The upper end of the stem is hollow and has inclosed therein a spring 56 by means of which the annular plate 57 supporting the lower ends of the cords 54 is automatically raised upon the release of the ribs 53. The stem 55 is pivoted at its lower end in a lug 58 on the frame of the plane. A spring 59 actuates the stem 55 and its carried parts to vertical position, as clearly shown in Fig. 4 of the drawings. In closed or normal position the safety devices lie in a horizontal position on the top of the plane and are retained in this position by means of a spring lock device 60, shown clearly in detail in Fig. 7. By means of cords this lock device may be controlled by the aviator as the occasion for the use of the safety device may arise, and the parachute will automatically assume an open position as shown in Fig. 9 of the drawings.

A preferred arrangement of the power transmission mechanism, whereby power from the driven shafts of the motors is transmitted to shafts 9, 11ª and 11ᵇ, is illustrated in Figs. 23, 24, 25, 26, 28 and 29 of the drawings. By suitable gearing, power from the driven shafts of the motors is transmitted to the counter-shafts 61, which are journaled in supports, which are rigidly secured to the lower part of the frame of the vehicle. The shafts 61 are geared to separate and independent motors and either one or both may be operatively connected with the central shaft 62 by manipulation of the clutch mechanism 63 interposed between each of said shafts 61 and shaft 62. The shaft 62 is geared directly to the vertical shaft 64, at its lower end, and shaft 64 is geared with the transverse shaft 9, at its upper end. A friction disk 65 is splined or feathered on the shaft 9, so that it is longitudinally movable thereon, which permits said disk 65 being moved into and out of frictional engagement with the friction wheels 66, one of which is keyed to each of the shafts 11ª and 11ᵇ.

By means of the lever connections 67 (Fig. 26) operatively mounted in the rack frame 68 which is suitably secured to the frame of the vehicle, the friction disk may be moved into and out of frictional engagement with the friction wheels 66, the pawl 69 holding the said element in frictional contact, as will be readily understood.

The friction wheels 66 are manipulated by independent lever and link connections 70ª and 70ᵇ which are so arranged that said wheels 66 may be moved across the face of the disk 65, whereby the speed of rotation of the shafts 11ª and 11ᵇ may be varied.

Clutch mechanism 71 is interposed in the shaft 11ᵇ, thereby permitting the rear propeller to be thrown into and out of operative connection with the driven mechanism.

It will be understood from the foregoing that my mechanism operates as follows: In making an ascent the plane is dropped to approximately a vertical position so that the resistance will be reduced to as low a degree as possible. The shafts carrying the front wheel and two side wheels are adjusted in vertical position, so that the wheels will revolve in a horizontal plane. The clutch mechanism is adjusted so that the maximum power will be transmitted to the propeller shafts. The blade-wheels revolving rapidly lift the vehicle. When the desired height is attained, the plane is adjusted at the proper angle of incidence, and the front and side wheels dropped, thus converting them into tractor or propelling means. The equilibrium of the vehicle is maintained by the adjustment of the front and side wheels at the proper angle, and the vehicle is steered by the rear wheel. By varying the speed of rotation of the side wheels, the vehicle may be raised, balanced, held at any desired height or lowered as desired. The variation of the speed of rotation of the side wheels may be effected through the control of the speed of the engine. It will be understood that the engines that are to be utilized as the motors for the airship are of the usual construction and are provided with throttle valves whereby their speed may be controlled. Thus it will be seen that the present mechanism has been designed for the ready and convenient control of the air vehicle under varying conditions, and is designed to meet all the requirements of a craft of this character.

I am aware that various modifications in the design and arrangement of the parts may be made without departing from the spirit and scope of my invention. I do not restrict myself, therefore, to exact features of construction shown and described, but what I claim and desire to secure by Letters Patent is—

1. An airship, comprising a frame, motors mounted in said frame, a vertical power transmission shaft mounted in said frame and driven by said motors, a transverse shaft mounted in the upper part of said frame and driven by said vertical shaft, horizontal transmission shafts driven by said transverse shaft, propellers driven by said transmission shafts, friction wheels mounted on said transmission shafts, a friction disk splined on said transverse shaft and movable longitudinally thereon into and out of engagement with said friction wheels, means for moving said friction disk into contact with said friction wheels to drive said transmission shafts, and means for moving said friction wheels toward and away from the axis of said disk to vary the speed of rotation of said friction wheels.

2. An airship, comprising a frame, motors mounted in said frame, a vertical power transmission shaft mounted in said frame and driven by said motors, a transverse shaft mounted in the upper part of said frame and driven by said vertical shaft, horizontal transmission shafts driven by said transverse shaft, propellers driven by said transmission shafts, friction wheels mounted on said transmission shafts, a friction disk splined on said transverse shaft and movable longitudinally thereon into and out of engagement with said friction wheels, means for moving said friction disk into contact with said friction wheels to drive said transmission shafts, and independent manipulative means for controlling the speed of rotation of said friction wheels.

3. In an airship, a frame, a motor carried by said frame, a power shaft driven by said motor, lateral extensions supported by said frame, an adjustable shaft mounted near the outer extremity of each of said extensions, a propeller carried by each of said shafts, means for moving said shafts to various adjustments, a drive shaft for said side propeller shafts, a shaft mounted at the front end of said frame, a propeller on said front shaft, independent means for moving said front shaft to different adjustments, a drive shaft for the front propeller shaft, a steering propeller supported at the rear end of said frame, means for moving said propeller laterally in either direction, a drive shaft for said steering propeller and power connections between said power shaft and said driving shafts, whereby the driving shafts for the front and rear propeller may be driven at varying rates of speed with respect to said driving shafts for the side propeller, substantially as specified.

4. An airship comprising a frame, a motor mounted on said frame, a power shaft driven by said motor, a transverse shaft driven by said power shaft, a revoluble support adjacent to each end of said shaft, a rack on each of said supports, a worm engaging each of said racks for moving said supports, a manually rotatable shaft operatively connected to each of said worms, a shaft journaled in each of said supports, propellers on said last-named shafts, a front propeller driven by said transverse shaft and power connections between said front propeller shaft and said transverse shaft whereby said front propeller may be driven at varying ratios of speed with respect to said transverse shaft, substantially as specified.

5. In an airship, a frame, motors located in said frame, a shaft mounted transversely of said frame and driven by said motors, an adjustable support mounted adjacent to each of said transverse shafts, propeller shafts mounted in said supports and geared to said transverse shaft, means for varying the angle of said propeller shafts with respect to the axis of said transverse shaft, a rear propeller mounted at the rear end of said frame, means for moving said rear propeller in either direction with respect to said frame, a driving shaft for said rear propeller and power connections between said transverse shaft and said power shaft whereby said power shaft may be rotated at varying ratios of speed with respect to said transverse shaft, substantially as specified.

6. In an airship, a frame, an aeroplane support pivotally mounted above said frame, a plane carried by said support, a rotatable shaft arranged parallel with the axis of the pivot of said aeroplane support, drums carried by said shaft, cables wound on said drums and secured to said aeroplane support at opposite sides of said pivot, an upright shaft, manually engageable means for rotating said upright shaft and gear connections between said upright shaft and said rotatable shaft whereby the same may be rotated to vary the angle of incidence of said plane, substantially as specified.

7. In an airship, the combination with a frame having a laterally adjustable driving propeller at one end thereof, propellers mounted at each side of said frame, said propellers independently adjustable with respect to said frame and with each other, and a propeller at the opposite end of said frame from said laterally adjustable propeller, adapted to be adjusted in a vertical plane with respect to said frame, an adjustable plane carried above the center of said frame, independent mechanism whereby each of said propellers may be adjusted, independent mechanism for adjusting said plane, power connections for driving said propellers, and means whereby the relative speed of said front propeller and said rear propeller may be varied with respect to the speed of said side propellers, substantially as specified.

8. In an airship, a frame, an arcuate propeller support carried at the rear of said frame, a power transmission shaft terminating in said frame, a propeller shaft having a universal joint connection with said power transmission shaft, a collar carried by said propeller shaft, a series of pulleys mounted in said frame, guide cables secured to said collar and operatively mounted on said pulleys and means for controlling said cables whereby said propeller shaft is adjusted laterally at any desired angle to guide the course of said airship, substantially as specified.

9. In an airship, a frame, motors mounted therein, a vertical power transmission shaft arranged to be driven by said motors, a transverse shaft mounted in the upper part of said frame and driven by said vertical shaft, longitudinally disposed transmission shafts, a friction disk splined on said transverse shaft, friction wheels carried by said longitudinally disposed transmission shafts and manipulative means for operatively connecting said friction disk and said friction wheels whereby said longitudinally disposed transmission shafts may be rotated at varying speeds, and propeller devices driven by said transmission shafts, substantially as specified.

10. In an airship, the combination with a frame having a laterally adjustable driving propeller at one end thereof, vertically adjustable propellers at each side of said frame, and a propeller at the front end of said frame, independent mechanism whereby each of said propellers may be adjusted, power connections for driving said propellers including an adjustable device whereby the relative speed of said front propeller and said rear propeller may be varied with respect to the speed of said side propellers, of an adjustable plane carried above said frame, and independent mechanism for adjusting the angle of incidence of said plane, substantially as specified.

In witness whereof, I have signed this specification in the presence of two subscribing witnesses.

JOHN W. OMAN.

Witnesses:
P. P. MASON,
DOROTHY FRISINGER.